No. 773,046. PATENTED OCT. 25, 1904.
J. C. BAYLES.
FLEXIBLE AND EXPANSIBLE PIPE COUPLING.
APPLICATION FILED MAR. 29, 1900. RENEWED MAR. 17, 1904.
NO MODEL.
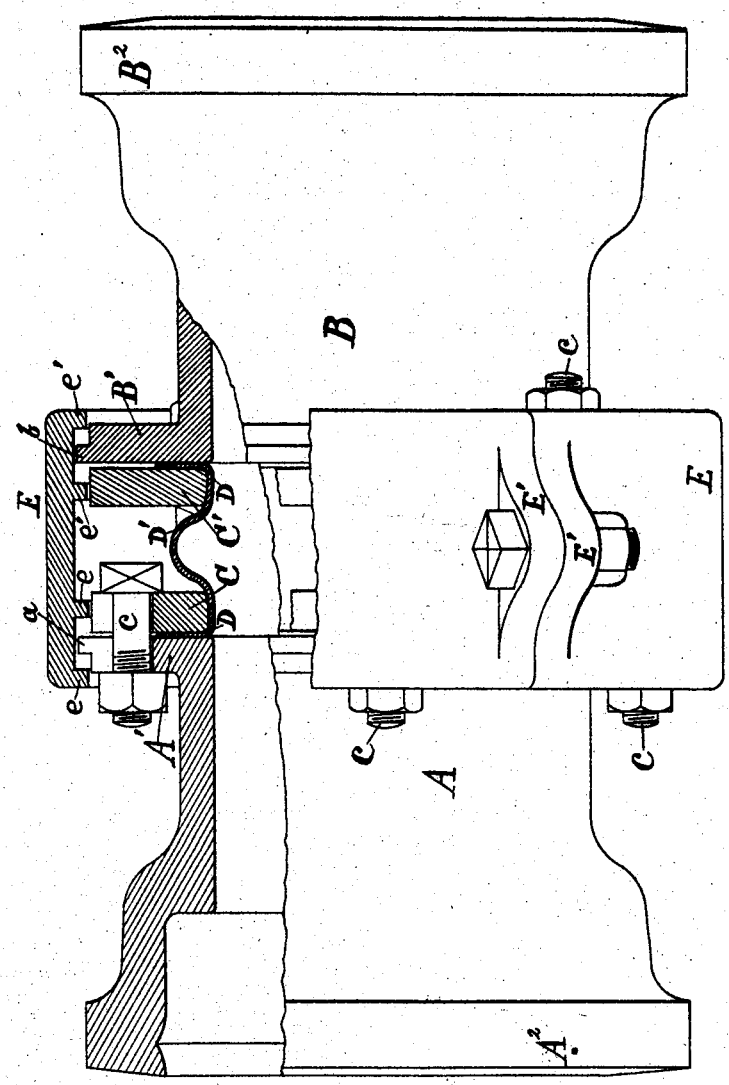
WITNESSES
Lewis C Bayles
Alexander Mitchell
James C. Bayles.
INVENTOR
by Frederick S. Duncan
ATTY No. 773,046. Patented October 25, 1904.

UNITED STATES PATENT OFFICE.

JAMES C. BAYLES, OF EAST ORANGE, NEW JERSEY.

FLEXIBLE AND EXPANSIBLE PIPE-COUPLING.

SPECIFICATION forming part of Letters Patent No. 773,046, dated October 25, 1904.

Application filed March 29, 1900. Renewed March 17, 1904. Serial No. 198,662. (No model.)

*To all whom it may concern:*

Be it known that I, JAMES C. BAYLES, a citizen of the United States, residing at East Orange, county of Essex, State of New Jersey, have invented a certain new and useful Improvement in Flexible and Expansible Pipe-Couplings, of which the following is a specification, reference being had to the drawing accompanying and forming a part of the same.

The invention relates generally to mechanism for flexibly and expansibly connecting sections of pipe.

The object of my invention is to provide a flexible expansion-coupling for pipes which are rigid in themselves and which by reason of changes of temperature, unequal settling, and other natural or accidental causes are subject to movements tending to fracture rigid pipe-lines or cause them to separate at the joints.

The invention consists generally of means for flexibly and expansibly connecting the ends of juxtaposed sections of pipe and maintaining unconstricted passage between such sections, whether in a straight or deviating line, and for making repair-fittings of the character hereinafter described. These means comprise a preferably cylindrical section of flexible material, such as a ductile metal, and devices such as are hereinafter described for tightly connecting the ends of the ductile section to the ends of the rigid pipe-sections.

I am aware that heretofore flexible coupling-sections of various shapes and materials to accommodate movement in pipe-lines have been used and patented—as, for example, in United States Letters Patent No. 582,575, dated May 11, 1897, issued to James C. Bayles; but I believe that the means I shall hereinafter describe and claim for connecting the flexible section to the rigid pipe-sections are new with me and accomplish results not contemplated in or attainable by devices heretofore in use or described in any patent. It will be noted that the use of the bead or rib on the outer circumference of the pipe and of the beveled driving-ring encircling the pipe, which are the essence of the invention set forth in said Letters Patent No. 582,575, necessitates making the sleeve of a readily - compressible material capable of being so tightly compressed between the bead or rib and the beveled driving-ring as to tightly seal the joint between the rib and the ring. A material capable of such compression by such means—as lead, for example—is too soft and ductile to be employed as an element of a coupling for lines carrying gases or fluids under high pressure. In my present invention I do not deform the ends of the flexible section by compressing, but hold them firmly between flat surfaces in a position substantially perpendicular to the axis of the pipe, as will be hereinafter described. Flexible material of comparatively little compressibility, such as copper or even soft steel, may therefore be used for the coupling-section.

The accompanying drawing is a side view of a repair-fitting embodying my invention, the upper part being cut away and shown in section.

A represents a section of pipe having a flange A' at or near the end to which the flexible coupling is to be attached. A² is a hub of ordinary construction. It should be understood, however, that the free ends of the rigid pipes may be of any desired construction. B is another section of pipe having a flange B' corresponding to the flange A' and having a similar hub B². The flanges may be of any suitable form and may be integrally connected with the pipes or attached in any other suitable manner. Instead of continuous flanges surrounding the ends of the rigid pipes a series of separate flanges, lugs, or shoulders suitably attached to the pipes or even a suitably-thickened end of the rigid pipe may be used to perform the same function—viz., of providing fixed bearings for the bolts or other means employed to draw the followers toward the ends of the pipes, as hereinafter described. The term "flange" as hereinafter used in this connection should therefore be understood as covering any such suitable modification thereof. The outer edges of the flanges A' and B' may be provided with shoulders $a$ and $b$ for the purpose hereinafter stated.

C and C' are follower-rings having faces approximately conforming in contour to the faces of the flanges A' and B', respectively, and having their inner corners preferably slightly rounded. The followers C and C' are adapted to be held in position opposite the faces of the flanges A' and B', respectively, by bolts $c$ $c$, passing through the followers and the flanges.

D is the flexible section of the coupling, (preferably having a protruding middle zone, as at D,) the ends of which said section are flanged, so that when in use the flanged ends of the flexible section D come between the followers C and C' and the ends of the pipes A and B and the flanges A' and B', respectively. By means of the bolts $c$ $c$ or any other suitable means the followers are drawn toward the flanges and the ends of the flexible section D are clamped and firmly held between the followers and the ends of the pipes. If the flanges A' and B' are flush with the ends of the pipes, as is the preferable though not necessary construction, the faces of the flanges become for all practical purposes also the ends of the pipe, and the ends of the flexible section are held between the followers and the surface composed of the faces of pipe and of the flanges, which together constitute the end of the pipe. In using the phrase "end of the rigid pipe" as describing the surface against which the end of the flexible section is held by the followers I intend, therefore, in proper cases to include the face of the flange as well as the face of the rigid pipe-section.

E E are two half-collars which when joined surround the coupling and which may have two sets of interior shoulders, as shown at $e$ $e$ and $e'$ $e'$, so placed that the shoulders $a$ of the flange A' and $b$ of the flange B' fit loosely therein. The distance between the interior shoulders comprising each set is considerably greater than the width of the inclosed shoulders $a$ and $b$. The half-collars E E when placed in position surrounding the flanges A' B' are joined by bolts or rivets passing through outwardly-projecting lugs E' E' at the ends of the half-collars or in other suitable manner. The collar, as shown, performs three separate functions—protecting the ductile section from external injury, holding the two rigid sections in an articulate relation, and restricting the movement due to expansion, contraction, or deflection within limits which involve no excessive or injurious strain upon the flexible section by which such movement is accommodated. The shoulders $a$ and $b$ may be omitted and the collar be made to fit directly upon the flanges A' and B' or upon the lugs that may take the place of the flanges, and other obvious changes and modifications may be made in the collar and the flanges without affecting the desired functions of the former. The freedom of the movement which this collar gives is much in excess of that needed to accommodate all movements normal to pipe-lines in use as conduits under or above ground.

In laying a pipe-line made flexible by the use of my coupling the coupling is used at such intervals as may be necessary to accommodate all the movements due to natural or accidental causes. This may be between every length or between runs of pipe composed of several lengths rigidly united. In either case the pipe-line is essentially a series of rigid sections connected by flexible sections in the manner hereinbefore described.

It is obvious that my invention is applicable to all kinds of pipe of whatever material and that various subordinate changes and modifications may be made in my device in applying it to commercial use without departing from the spirit of my invention. In some instances it may be desirable to place suitable gaskets or washers between the ends of the pipe and of the flexible section. If desired, the followers may be attached to and made part of the flexible and expansible section.

By using the means herein described for connecting the flexible section to the rigid pipes I am enabled to make as a new article of manufacture a repair-fitting having peculiar characteristics. Heretofore when a section of pipe has broken it has been usual either to substitute an entire new section of rigid pipe, the laying of which necessitates the digging up of at least two sections of pipe, or in an imperfect manner to mend the broken section by inclosing it in a split sleeve. The joints between such split sleeve and the broken ends of the pipe have been necessarily makeshift and unsatisfactory.

The accompanying drawing shows my repair-fitting containing my flexible and expansible joint. The short pipe A has the usual form of hub $A^2$ at its extremity, and the short pipe B is similarly equipped. These short pipes are to be connected by the flexible section, as above described, to form my repair-fitting, which is applied as follows: A suitable length of the broken section of pipe is cut out. The hub of the section A is slipped over the end of the broken pipe and rigidly jointed thereto in the usual manner, and the hub of the section B is similarly slipped over and secured to the other end of the broken pipe. The flexible section D and the followers are then slipped between sections A and B and are secured thereto by the bolts $c$ $c$. The collars E E may then be put in place. Thus the joints between the repair-fitting and the pipe-line are of the usual rigid kind and are not makeshift, only a short section of pipe has to be exposed, and the repaired pipe is flexible and may thus successfully accommodate itself to a repetition of the strain which caused the former break.

My repair-fitting need not of course always have hubs on both ends, although that will be the usual form in which I will use it, but may have at its outer ends half-couplings adapted to make any usual form of pipe-joint.

Having thus described my invention, what I claim as new, and desire to secure by Letters Patent, is—

1. A fitting for pipe-lines comprising two rigid pipe-sections having opposing flanges, a flexible expansible pipe-section rigidly secured to said flanges and a collar provided with internal shoulders engaging said flanges to hold said pipe-sections in alinement and to prevent excessive longitudinal movement of the same.

2. A fitting for pipe-lines composed of two rigid pipe-sections, the inner ends of which are flanged and the outer ends of which are provided with half-couplings, a flexible expansible pipe-section, followers, and means for drawing the followers toward the inner ends of the rigid pipe-sections and firmly holding the ends of the flexible section between the followers and the ends of said rigid pipe-sections, substantially as and for the purposes above set forth.

3. An inset-fitting for pipe-lines consisting of three pipe-sections; the two end sections rigid, having their inner extremities flanged, and carrying at their outer extremities hubs or bells; and the middle section removable, consisting of a flexible expansible pipe-section as long as the depth of one hub, with means for uniting said sections; whereby said fitting may be inserted in sections into a space in the pipe-line equal to the distance between the bottom of the hubs of the assembled fitting, substantially as and for the purpose above set forth.

4. The combination of flanged rigid pipe-sections, followers, a flexible pipe-section, means for drawing the followers toward the pipe ends and tightly holding the ends of the flexible pipe-section between the followers and the ends of the rigid pipe-sections, and means for holding the rigid pipe-sections in approximately articulate relation and giving them a limited freedom of movement relative to each other, substantially as and for the purposes above set forth.

5. The combination of flanged rigid pipe-sections, followers, a flexible pipe-section, means for drawing the followers toward the pipe ends and tightly holding the ends of the flexible sections between the followers and the pipe ends, and an adjustable collar surrounding the flexible pipe-section and the adjacent ends of the rigid pipe-sections and having interior ribs engaging with exterior projections on the ends of the rigid pipe-sections, substantially as and for the purposes above set forth.

6. The combination of flanged rigid pipe-sections, followers, a flexible pipe-section, means for drawing the followers toward the ends of the rigid pipe-sections and tightly holding the ends of the flexible pipe-section between the followers and the ends of the rigid pipe-sections, and an adjustable collar surrounding the juxtaposed flanged ends of the rigid pipe-sections and the flexible pipe-section, said collar having interiorly-projecting ribs adapted to engage with exterior projections on the rigid pipe-sections, and means for securing said collar around said rigid pipe ends, substantially as and for the purposes herein set forth.

7. In combination with two rigid pipe-sections, joined by a flexible expansible pipe-section, a guard-collar having channels on its interior surface to engage exterior projections on the rigid pipe-sections, and means for securing said guard-collar around the ends of said rigid pipe-sections, whereby the rigid pipe-sections are held in approximately articulate relation with limited freedom of longitudinal movement, and the flexible pipe-section is protected from external injury, substantially as above set forth.

8. A collar consisting of an annular band having on its interior surface ribs or channels adapted to engage projections on the juxtaposed ends of two members the ends of which are surrounded by said band and means for adjustably securing such collar around the ends of such members; whereby said members are held in approximately articulate relation and are permitted limited freedom of lateral and longitudinal movement, substantially as and for the purposes above set forth.

JAMES C. BAYLES.

Witnesses:
LEWIS C. BAYLES,
ALEXANDER MITCHELL.